United States Patent
Ormond et al.

(10) Patent No.: US 7,260,284 B2
(45) Date of Patent: Aug. 21, 2007

(54) SEMICONDUCTOR INTEGRATED CIRCUIT AND SEMICONDUCTOR INTEGRATED CIRCUIT ARRANGEMENT DEVICE AND PROCESS

(75) Inventors: Brian Ormond, Ebina (JP); Toshimichi Iwamori, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 11 days.

(21) Appl. No.: 11/150,228

(22) Filed: Jun. 13, 2005

(65) Prior Publication Data
US 2006/0062511 A1    Mar. 23, 2006

(30) Foreign Application Priority Data
Sep. 21, 2004    (JP)    ............... 2004-273964

(51) Int. Cl.
*G02B 6/12*    (2006.01)
(52) U.S. Cl. ............................................. 385/14
(58) Field of Classification Search ................. 385/14; 257/16, 666
See application file for complete search history.

(56) References Cited

U.S. PATENT DOCUMENTS

| | | | | |
|---|---|---|---|---|
| 5,049,977 A | * | 9/1991 | Sako | ................ 257/676 |
| 5,083,189 A | * | 1/1992 | Sawaya | ................ 257/791 |
| 5,455,199 A | * | 10/1995 | Sakamoto | ................ 438/26 |
| 5,592,019 A | * | 1/1997 | Ueda et al. | ................ 257/666 |
| 5,909,053 A | * | 6/1999 | Fukase et al. | ................ 257/666 |
| 6,239,367 B1 | * | 5/2001 | Hsuan et al. | ................ 174/528 |
| 6,403,948 B1 | * | 6/2002 | Tachigori | ................ 250/227.11 |
| 6,479,327 B2 | * | 11/2002 | Takahashi et al. | ................ 438/124 |
| 6,621,223 B1 | * | 9/2003 | Hen | ................ 315/56 |
| 6,903,448 B1 | * | 6/2005 | Sutardja et al. | ................ 257/666 |

FOREIGN PATENT DOCUMENTS

JP    A 11-273816    10/1999

* cited by examiner

Primary Examiner—Ellen E. Kim
(74) Attorney, Agent, or Firm—Oliff & Berridge, PLC

(57) ABSTRACT

A semiconductor integrated circuit which includes an optical device for performing optical communication and which exhibits a predetermined function. This semiconductor integrated circuit includes a first electricity supply portion, which is connected to the optical device, and a second electricity supply portion, which differs from the first electricity supply portion and is connected to the optical device.

5 Claims, 15 Drawing Sheets

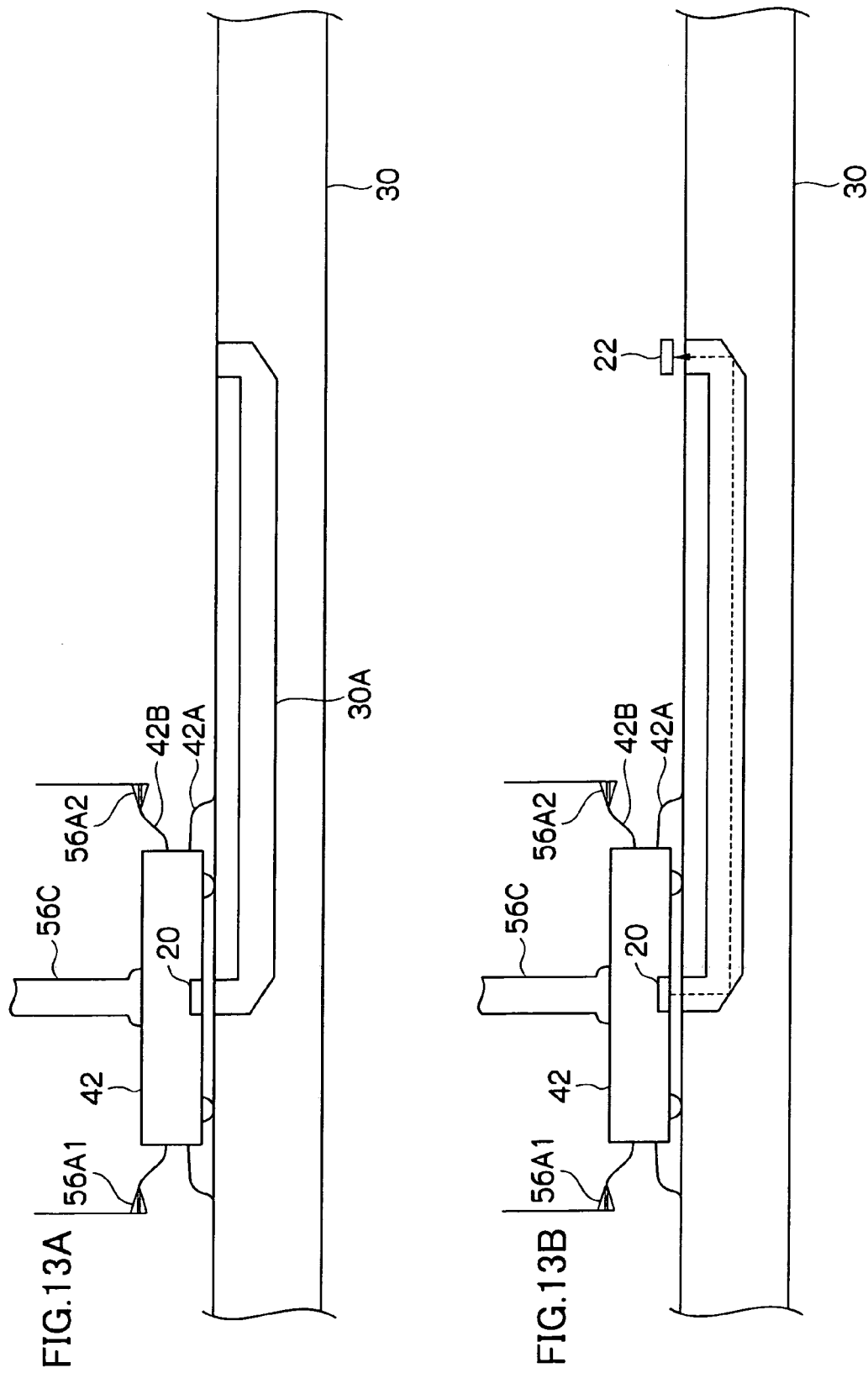

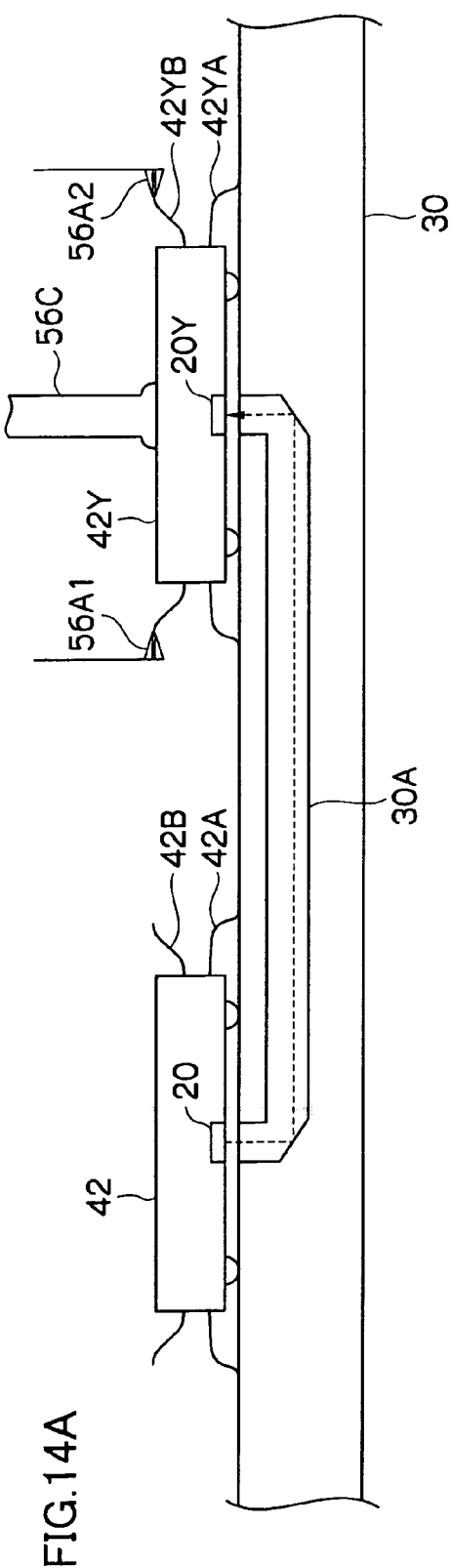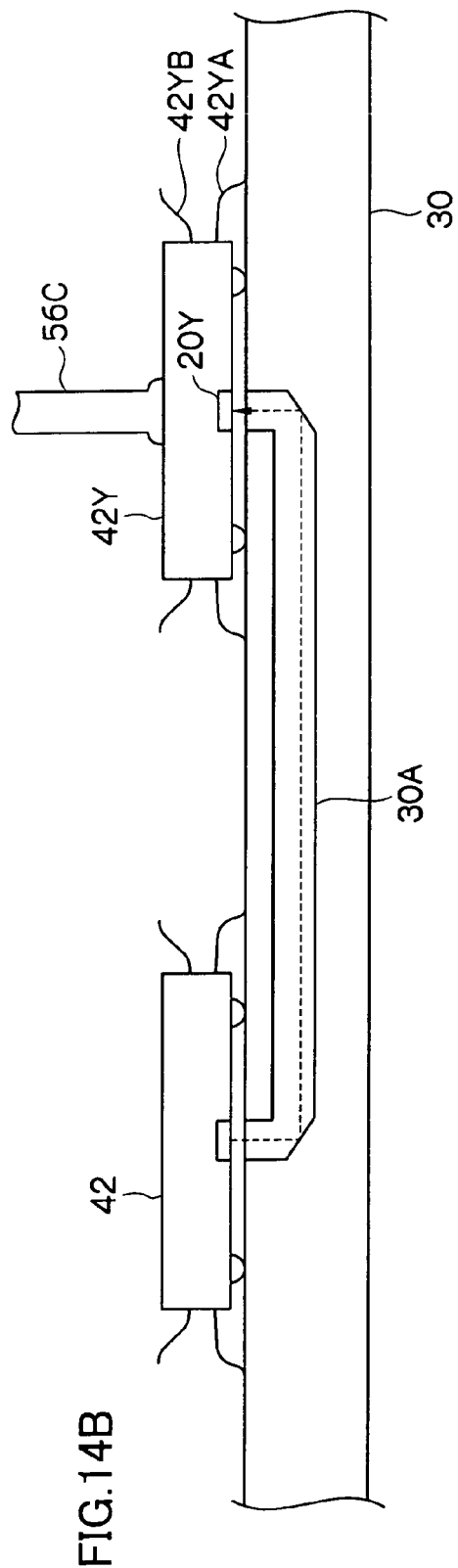

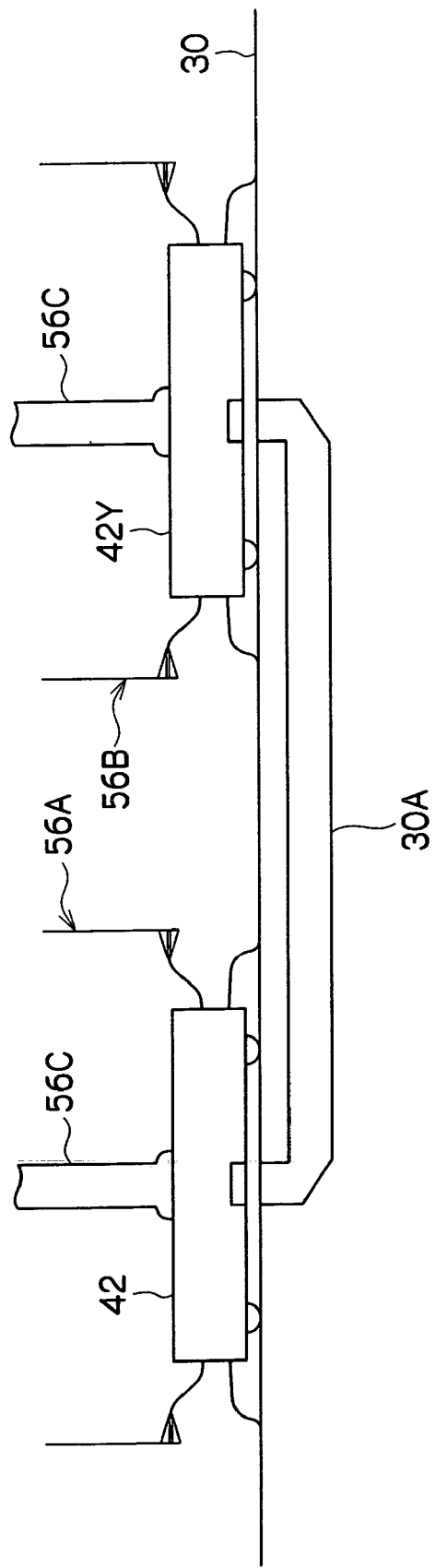

SEMICONDUCTOR INTEGRATED CIRCUIT AND SEMICONDUCTOR INTEGRATED CIRCUIT ARRANGEMENT DEVICE AND PROCESS

CROSS-REFERENCE TO RELATED APPLICATION

This application claims priority under 35 USC 119 from Japanese Patent Application No. 2004-273964, the disclosure of which is incorporated by reference herein.

BACKGROUND OF THE INVENTION

1. Field of the Invention

The present invention relates to a semiconductor integrated circuit and to a semiconductor integrated circuit arrangement device and process, and more particularly relates to a semiconductor integrated circuit which includes an optical device for optical communication and is structured so as to exhibit a predetermined function, and to a semiconductor integrated circuit arrangement device and process for arranging this semiconductor integrated circuit at a predetermined position.

2. Description of the Related Art

Heretofore, semiconductor integrated circuits which include optical devices and are structured so as to exhibit predetermined functions have been proposed. When such a semiconductor integrated circuit is being arranged at a printed circuit board, it is not judged whether or not the optical device(s) function(s) properly. Consequently, it has been possible for semiconductor integrated circuits equipped with unsatisfactory optical devices to be arranged at printed circuit boards.

Furthermore, conventionally, semiconductor integrated circuits have been arranged at printed circuit boards as described below (see Japanese Patent Application Laid-Open (JP-A) No. 11-273816). Specifically, optical devices dedicated to positioning are provided beforehand at each of a semiconductor integrated circuit and a printed circuit board. When the semiconductor integrated circuit is being arranged at the printed circuit board, the semiconductor integrated circuit is positioned at the printed circuit board at a position at which conditions of light emission and light reception, by the optical devices for positioning which have been provided at the semiconductor integrated circuit and the printed circuit board, are optimal.

However, even if a semiconductor integrated circuit is positioned at a printed circuit board using optical devices for positioning in this manner and the optical devices for positioning are disposed at accurate positions, there may be fabrication errors and the like unrelated to the optical devices for positioning, which may cause a mounted optical device to be disposed at a position which is offset from an original position.

SUMMARY OF THE INVENTION

The present invention has been devised in consideration of the circumstances described above, and provides a semiconductor integrated circuit, semiconductor integrated circuit arrangement device and semiconductor integrated circuit arrangement process which are capable of preventing the arrangement at predetermined positions of unsatisfactory semiconductor integrated circuits.

The present invention also provides a semiconductor integrated circuit arrangement device and process capable of directly positioning an optical device that is to be positioned at a scheduled position of arrangement and improving accuracy of positioning of a semiconductor integrated circuit.

A first aspect of the present invention is a semiconductor integrated circuit which includes an optical device for optical communication and is structured so as to exhibit a predetermined function, the semiconductor integrated circuit including: a first electricity supply portion connected to the optical device; and a second electricity supply portion connected to the optical device, which differs from the first electricity supply portion.

That is, the semiconductor integrated circuit of the present invention includes the optical device for performing optical communication and has structure such that the predetermined function is realized. The first electricity supply portion and the second electricity supply portion are connected to this optical device.

A semiconductor integrated circuit arrangement device of a second aspect of the present invention includes: a retaining portion which touches the second electricity supply portion of the semiconductor integrated circuit and retains the semiconductor integrated circuit; a movement section which moves the retaining portion; an operating portion which operates the optical device by supplying current via the retaining portion and the second electricity supply portion; and a judgment section which judges quality of the optical device on the basis of an operating state of the optical device caused by the operating portion.

With the invention described above, it is judged whether the semiconductor integrated circuit is satisfactory or not and the semiconductor integrated circuit is arranged at a predetermined scheduled position of arrangement. However, it is also possible for the semiconductor integrated circuit to be arranged at the predetermined scheduled position of arrangement without judging whether the semiconductor integrated circuit is satisfactory or not. In other words, a semiconductor integrated circuit arrangement device of a third aspect of the present invention is a semiconductor integrated circuit arrangement device which includes: a retaining portion which touches the second electricity supply portion of the semiconductor integrated circuit and retains the semiconductor integrated circuit; a movement section which moves the retaining portion; and an operating portion which operates the optical device, wherein the movement section disposes the semiconductor integrated circuit at a pre-specified scheduled position of arrangement, disposes a positioning optical device at an optical communication position, at which optical communication with the optical device of the semiconductor integrated circuit is possible, and, in a state in which the optical device is being operated, positions the semiconductor integrated circuit on the basis of a condition of optical communication between the optical device and the positioning optical device.

A semiconductor integrated circuit arrangement process of a fourth aspect of the present invention is a semiconductor integrated circuit arrangement process for arranging a semiconductor integrated circuit, which includes an optical device for optical communication and is structured so as to exhibit a predetermined function, at a predetermined position of arrangement, the process including: a step of operating the optical device; a step of performing optical communication with the optical device which is being operated by the step of operating; and a step of positioning the semiconductor integrated circuit with respect to a board on the basis of a condition of optical communication in the step of performing optical communication.

BRIEF DESCRIPTION OF THE DRAWINGS

An embodiment of the present invention will be described in detail based on the following figures, wherein:

FIG. 13A is a view of a time when the first IC chip has been moved to the scheduled position of arrangement;

FIG. 13B is a view showing a state in which a light-detecting element is disposed at a scheduled position of arrangement of an optical device of the second IC chip and optical communication is performed between the optical device of the first IC chip and the light-detecting element;

FIG. 14A is a view of a time when the second IC chip is being arranged;

FIG. 14B is a view showing a state when the second IC chip has been positioned;

FIG. 15 is a view showing a state of positioning of a first IC chip and a second IC chip relating to a variant example of the present embodiment;

DETAILED DESCRIPTION OF THE INVENTION

Figure 1A:
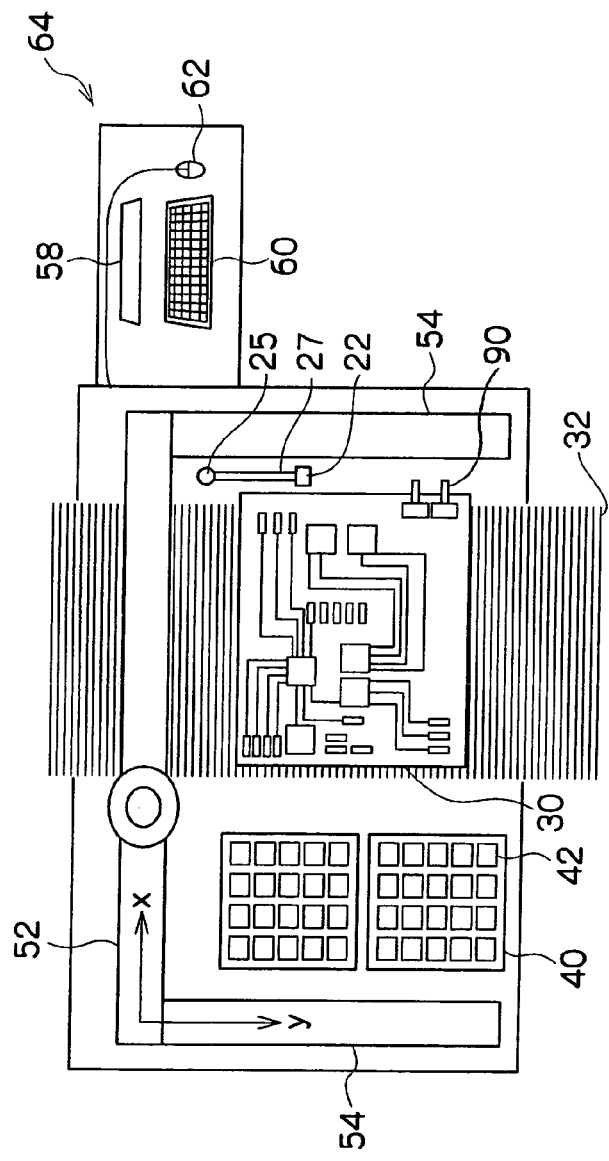
FIG. 1A is a schematic view of a mounter relating to the present embodiment, being a plan view of the mounter.
Figure 1B:
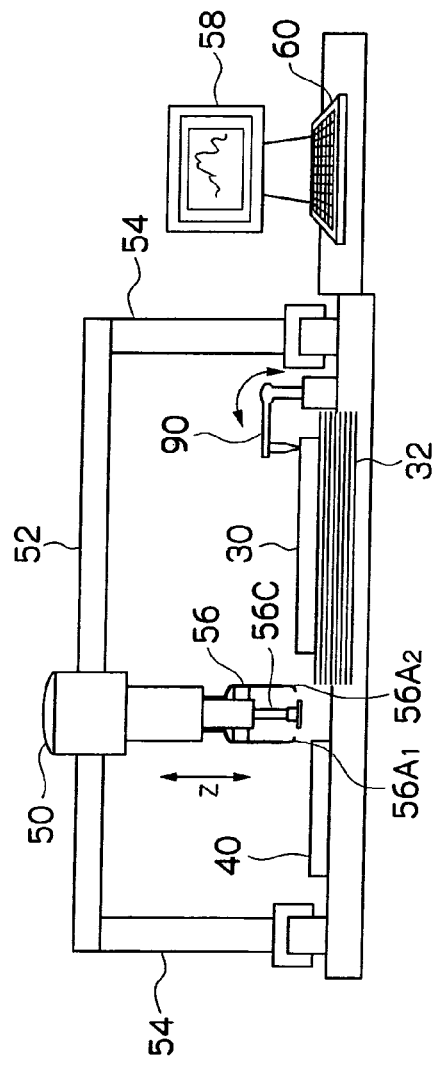
FIG. 1B is a schematic view of the mounter, being a side view of the mounter.

As is shown in FIG. 1, a mounter which serves as a semiconductor integrated circuit arrangement device relating to a present embodiment is provided with a conveyor belt 32, which transports a printed circuit board (PWPA) 30. A chip tray 40, at which plural IC chips 42 serving as semiconductor integrated circuits are arranged in a matrix pattern, is provided at a side of this conveyor belt 32.

Further, the mounter is provided with two y-direction shafts 54, which are formed in a r-shape at outer sides of a region of arrangement of both the chip tray 40 and the conveyor belt 32. An x-direction shaft 52 is provided to span between the two y-direction shafts 54. The x-direction shaft 52 is mounted at the y-direction shafts 54 to be movable in a Y direction. An arm 50 is mounted at the x-direction shaft 52 to be movable in an X direction. A distal end portion 56, which retains one of the IC chips 42, is mounted at the arm 50 to be movable in a Z direction, and to be additionally capable of fine movements in three dimensions. The distal end portion 56 is equipped with contact portions 56A1 and 56A2, which make contact with contact test terminals 42B of the IC chip 42, and a suction portion 56C, which applies suction and retains the IC chip 42. Note that the X, Y and Z directions are mutually orthogonal.

The mounter is also equipped with a movement mechanism 27. The movement mechanism 27 is mounted to be rotatable about a shaft 25, for moving a light-detecting element 22 to a pre-specified position of the printed circuit board (PWPA) 30 (an optical communication position, which will be discussed later), and is capable of extending and retracting.

The mounter is further provided with a printed circuit board power supply section (a printed circuit board connecting section) 90, which connects with the printed circuit board 30 and supplies current to later-described optical devices for operating the same.

The mounter is also provided with a management device 64, which is provided with a display device 58, a keyboard 60 and a mouse 62, or the like.

Figure 2:
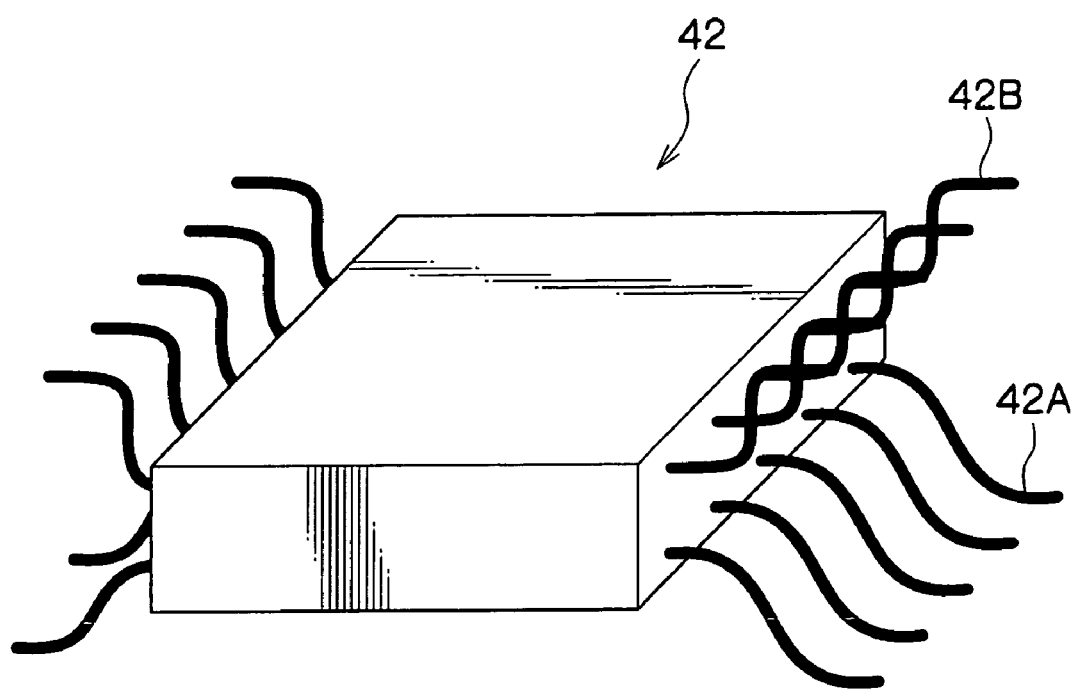
FIG. 2 is a perspective view of an IC chip.

As shown in FIG. 2, the IC chip 42 is equipped, at two opposite side faces thereof, with plural lead wires 42A, which serve as first electricity supply portions, and plural contact test terminals 42B, which serve as second electricity supply portions.

Figure 3A:
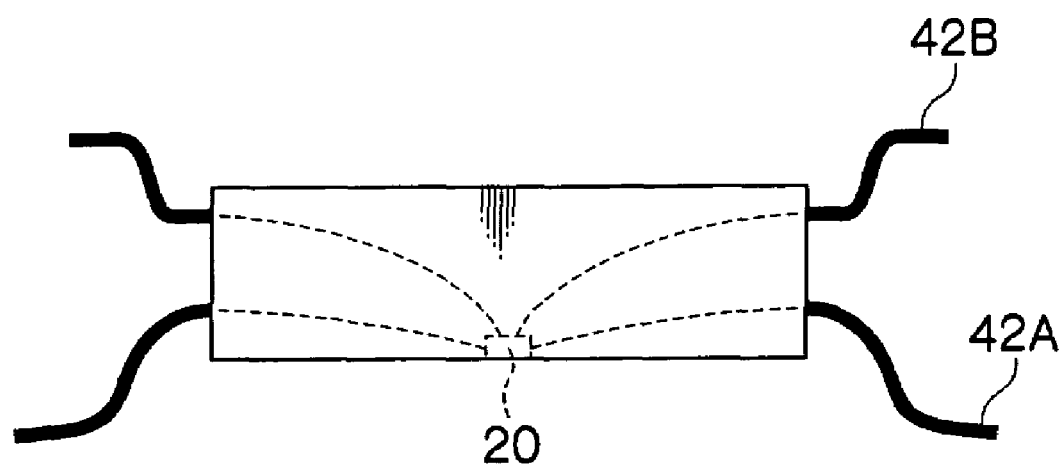
FIG. 3A is a sectional view of the IC chip.
Figure 3B:
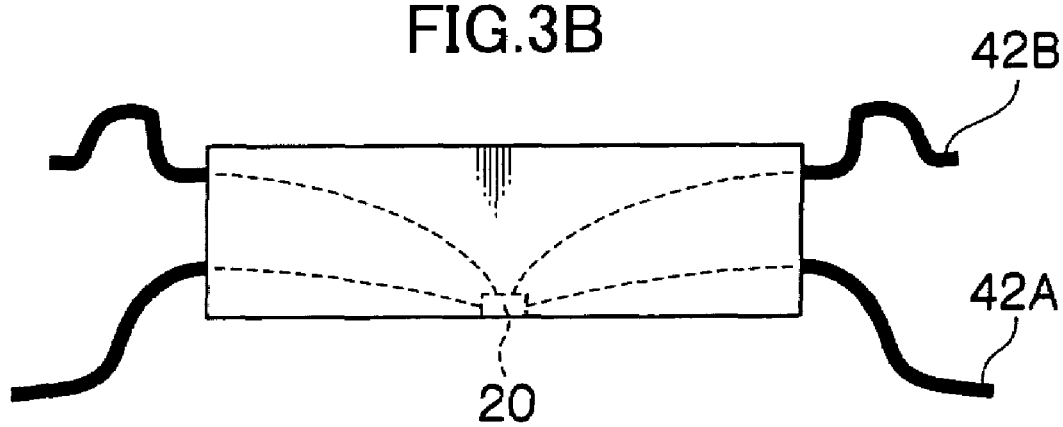
FIG. 3B is a sectional view of another IC chip.

As shown in FIG. 3A, the IC chip 42 includes plural optical devices 20 for optical communication and is structured so as to exhibit predetermined functions. The optical devices 20 are disposed at a bottom face of the IC chip 42, and the above-described lead wires 42A and contact test terminals 42B are connected to the optical devices 20. Here, the form of the contact test terminals 42B is not limited to a form which is bent through 90° twice, as is shown in FIG. 3A. A form shown in FIG. 3B, which is bent through 90° at four points, is also possible.

The contact test terminals 42B are structured to be connectable with another IC chip. This will be discussed in more detail later. The lead wires 42A are structured to be connectable with the printed circuit board 30 at which the IC chip 42 is to be arranged. Further, the lead wires 42A may be structured to be connectable with another IC chip. Current is supplied to the contact test terminals 42B during the IC mounting process and, as a result, the optical devices 20 are operated. Current may also be supplied to contacts 42A and or 42B to operate optical devices 20 during the normal operation of the device.

Figure 4C:
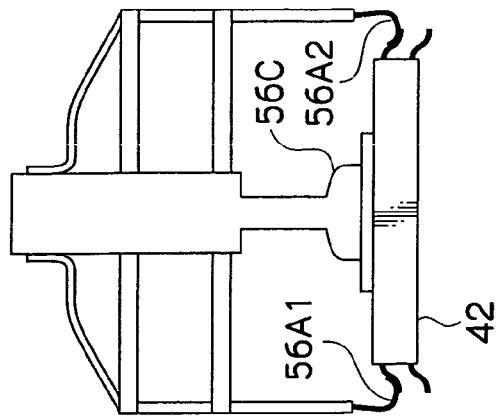
FIGS. 4A, 4B and 4C are views showing states of retention and lifting of an IC chip by a distal end portion of an arm.
Figure 4B:
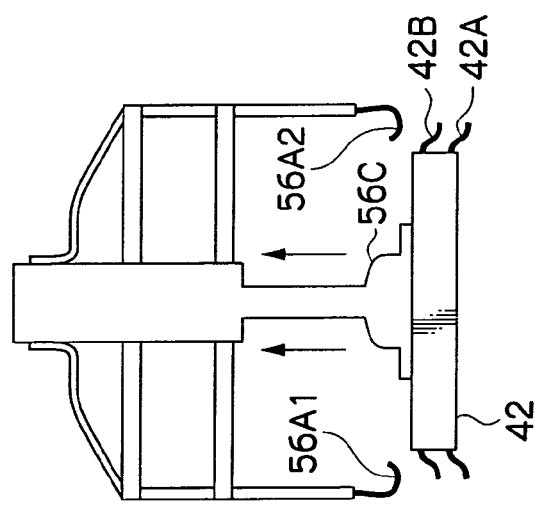
Figure 4A:
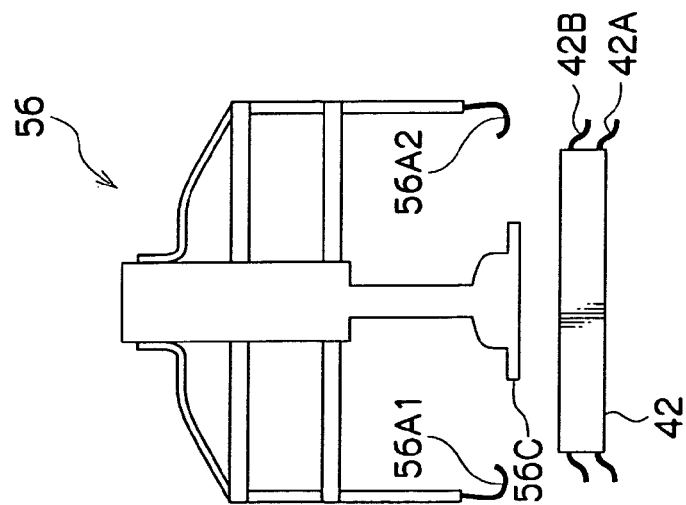

Next, with reference to FIGS. 4A to 4C, a state in which the distal end portion 56 of the arm 50 retains the IC chip 42 will be described. As shown in FIG. 4A, the suction portion 56C is extendably/retractably mounted at the distal end portion 56. The distal end portion 56 is also equipped with the contact portions 56A1 and 56A2 for contacting the contact test terminals 42B of the IC chip 42. As shown in FIG. 4A, the arm 50 extends the distal end portion 56 to a vicinity of the IC chip 42 and, as shown in FIG. 4B, the suction portion 56C is caused to touch the IC chip 42. When the suction portion 56C touches the IC chip 42, the suction portion 56C is retracted in a state in which the suction portion 56C is applying suction to the IC chip 42, and thus the IC chip 42 is lifted. When the IC chip 42 is lifted, the contact test terminals 42B of the IC chip 42 make contact with the contact portions 56A1 and 56A2, as shown in FIG. 4C.

Figure 5:
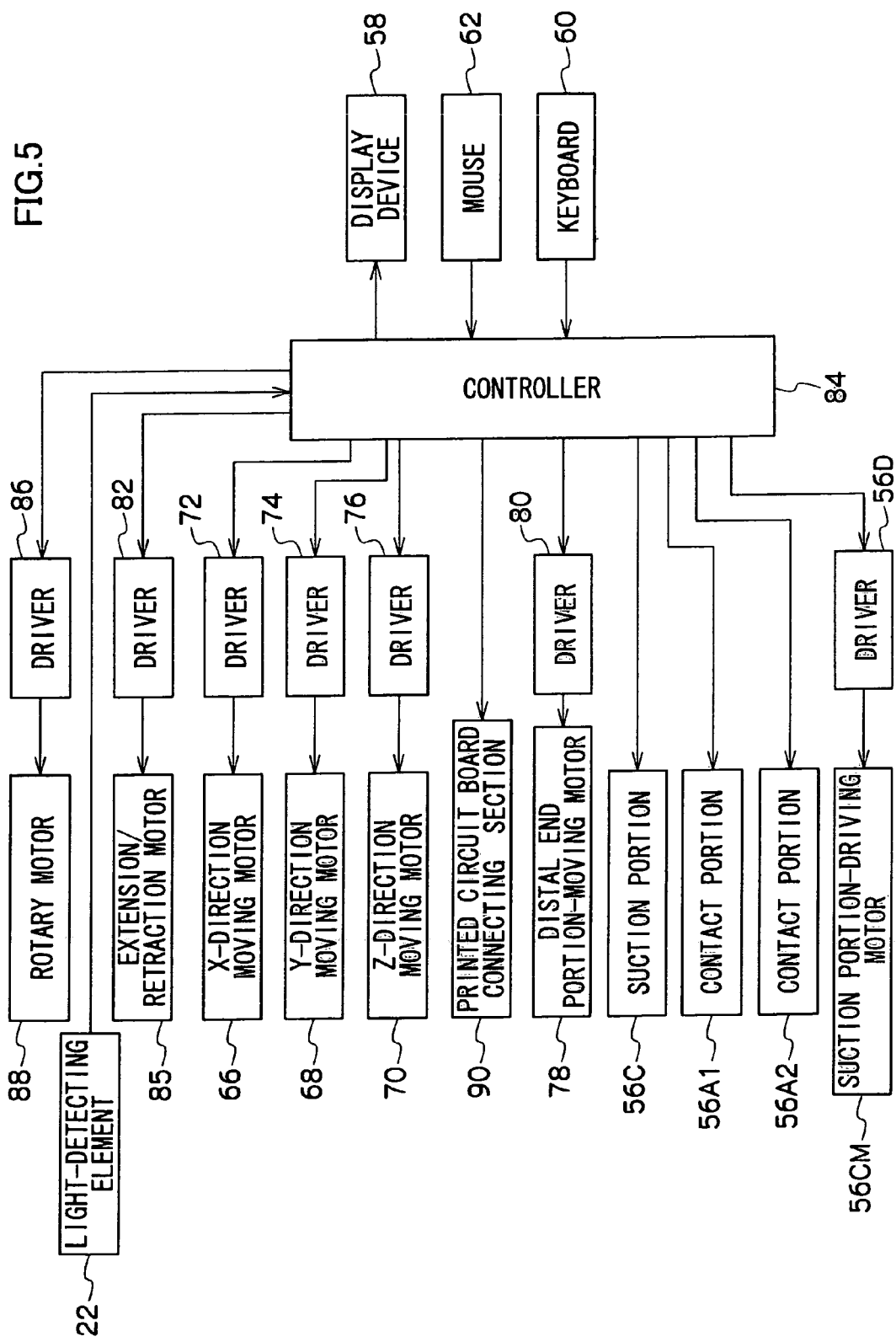
FIG. 5 is a block diagram of a control system of the mounter.

As shown in FIG. 5, a control system for the mounter is equipped with an x-direction moving motor 66, a y-direction moving motor 68 and a z-direction moving motor 70. The x-direction moving motor 66 moves the arm 50 in the X direction along the x-direction shaft 52, the y-direction moving motor 68 moves the x-direction shaft 52 in the Y direction along the y-direction shafts 54, and the z-direction moving motor 70 moves the distal end portion 56 of the arm 50 in the Z direction. This control system is also equipped with a distal end portion-moving motor 78, which is provided at the arm 50 and moves the distal end portion 56 in three dimensions.

Further, this control system is also equipped with a controller 84. The x-direction moving motor 66, the y-direction moving motor 68 and the z-direction moving motor 70 are connected to the controller 84 via respective drivers 72, 74 and 76, and the distal end portion-moving motor 78 is connected to the controller 84 via a driver 80.

The controller 84 can control the x-direction moving motor 66, the y-direction moving motor 68 and the z-direction moving motor 70 via the drivers 72, 74 and 76, to move the arm 50 in the X direction along the x-direction shaft 52, to move the x-direction shaft 52 in the Y direction along the y-direction shafts 54, and to move the distal end portion 56 provided at the distal end of the arm 50 in the Z direction. The controller 84 can also control the distal end portion-moving motor 78, via the driver 80, to move the distal end portion 56 provided at the arm 50 in three dimensions.

The two contact portions 56A1 and 56A2 of the distal end portion 56, the suction portion 56C and, via a driver 56D, a suction portion-driving motor 56CM are also connected to the controller 84. The suction portion-driving motor 56CM moves the suction portion 56C in a vertical direction (the Z direction). Thus, the controller 84 can move the suction portion 56C vertically, by controlling the suction portion-driving motor 56CM, and can operate the suction portion 56C. Furthermore, as will be described later, the controller 84 can supply current to the contact portions 56A1 and 56A2.

The controller 84 is further connected, via drivers 82 and 86, to an extension/retraction motor 85 and a rotary motor 88 at the movement mechanism 27, and is also connected to the light-detecting element 22. Thus, the controller 84 can control the extension/retraction motor 85 and the rotary motor 88 of the movement mechanism 27 via the drivers 82 and 86 and can move the light-detecting element 22 to the pre-specified position (the optical communication position to be described later).

Further, the printed circuit board power supply section 90 is connected to the controller 84, and the controller 84 can supply current to and operate the optical devices via the printed circuit board power supply section 90 and the printed circuit board 30.

Herein, the controller 84 is provided in the management device 64, and is also connected with the aforementioned display device 58, mouse 62 and keyboard 60.

Next, operation of the present embodiment will be described.

Figure 6:
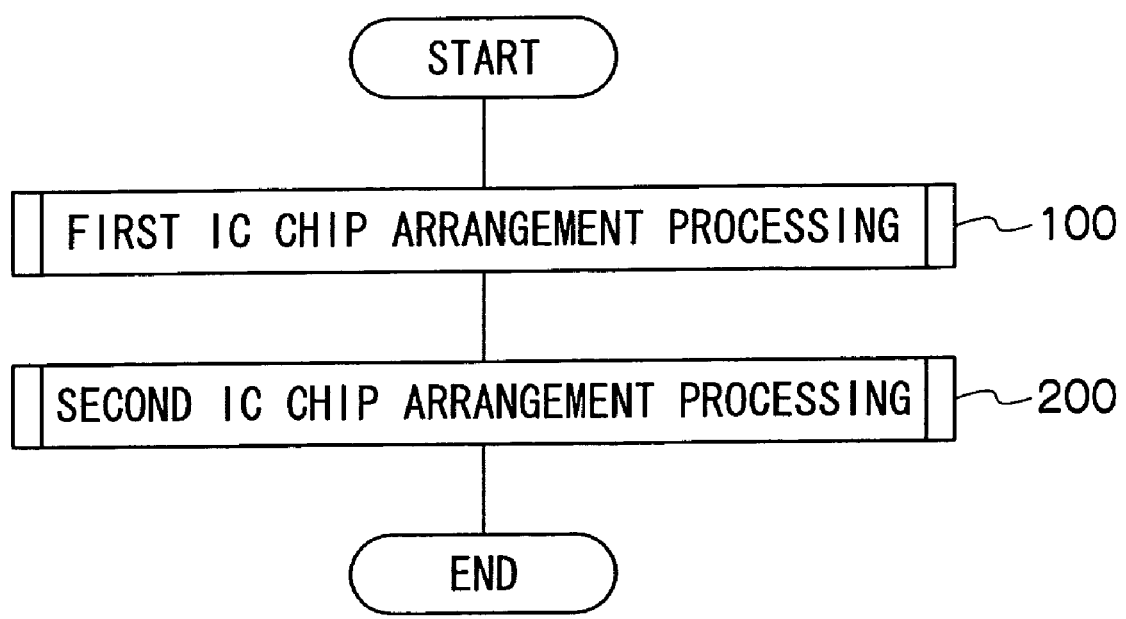
FIG. 6 is a flowchart showing an arrangement processing routine executed by the mounter.

FIG. 6 shows an IC chip arrangement processing routine which is executed by the mounter. This IC chip arrangement processing routine starts when a predetermined start button at the management device 64 is set to ON.

In the IC chip arrangement processing, a pair of IC chips is disposed at the printed circuit board, and this is performed repeatedly. However, in order to simplify the following descriptions, arrangement processing for only one pair of IC chips will be described. Of this pair of IC chips, the IC chip that is arranged first is referred to as a first IC chip (i.e. VCEL), and the IC chip that is arranged thereafter is referred to as a second IC chip (i.e. PD).

When this IC chip arrangement processing routine starts, arrangement processing of the first IC chip is executed in step 100, and arrangement processing of the second IC chip is executed in step 200.

Figure 7:
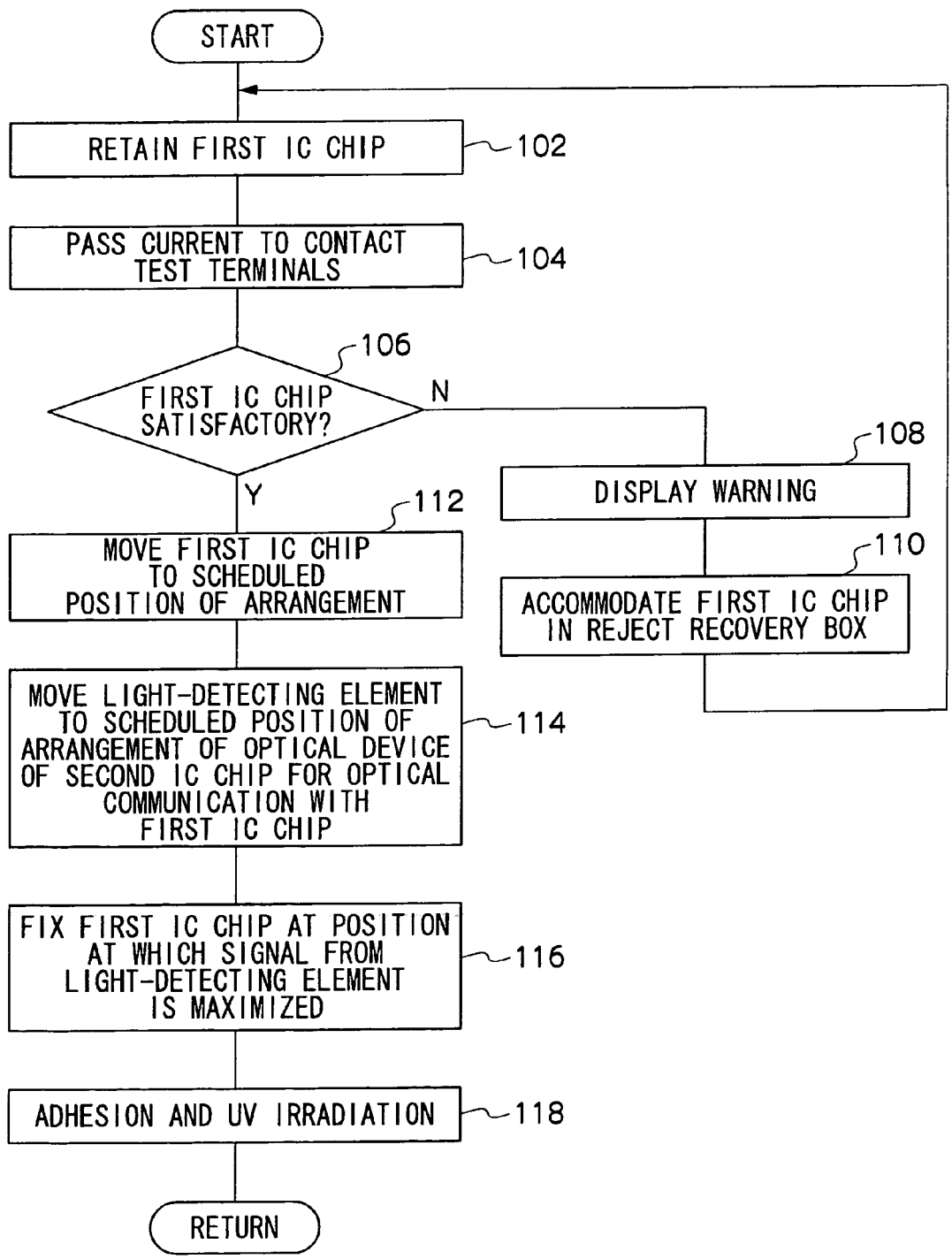
FIG. 7 is a flowchart showing a subroutine, of step 100 in FIG. 6, for arrangement processing of a first IC chip.

More specifically, in the arrangement processing of the first IC chip of step 100, as shown in FIG. 7, first, in step 102, the first IC chip 42 is retained. Specifically, in the present embodiment, the plural IC chips 42 arranged at the chip tray 40 are designated to be taken out in a sequence. In step 102, the arm 50 moves to above the IC chip 42 that is currently designated in the sequence. As shown in FIG. 4A, the distal end portion 56 is brought close above the IC chip 42, and then the suction portion 56C is caused to touch the IC chip 42. Then, in the state in which the IC chip 42 is being sucked by the suction portion 56C, the suction portion 56C is raised and, as shown in FIG. 4C, the contact portions 56A1 and 56A2 come into contact with the contact test terminals 42B of the IC chip 42.

In a next step 104, current is supplied through the contact portions 56A1 and 56A2 to the contact test terminals 42B. As mentioned earlier, the contact test terminals 42B are connected with the optical devices 20 of the IC chip 42 as shown in FIG. 3A. Thus, the current is applied via the contact portions 56A1 and 56A2 and the contact test terminals 42B to the optical devices 20.

In a next step 106, it is determined whether the first IC chip 42 is satisfactory or not. That is, if current flows in the optical devices 20 as a result of the supply of current to the optical devices 20 of the IC chip 42 by step 104, the optical devices 20 are satisfactory, which means that the IC chip 42 can be judged to be a satisfactory product. If current does not flow in the optical devices 20, the optical devices 20 are unsatisfactory, which means that the IC chip 42 can be judged to be a defective product. Accordingly, in the present step 106, the optical devices 20 are judged to be satisfactory or defective on the basis of operational states, meaning current supply states, of the optical devices 20. Thus, quality/defectiveness of the IC chip 42 can be determined.

If the IC chip 42 is judged defective in step 106, in step 108, a warning is displayed at the display device 58 and, in step 110, the first IC chip 42 is accommodated in an unillustrated reject recovery box. The routine returns to step 102, and executes the above processing (steps 102 to 106) again.

Figure 9:
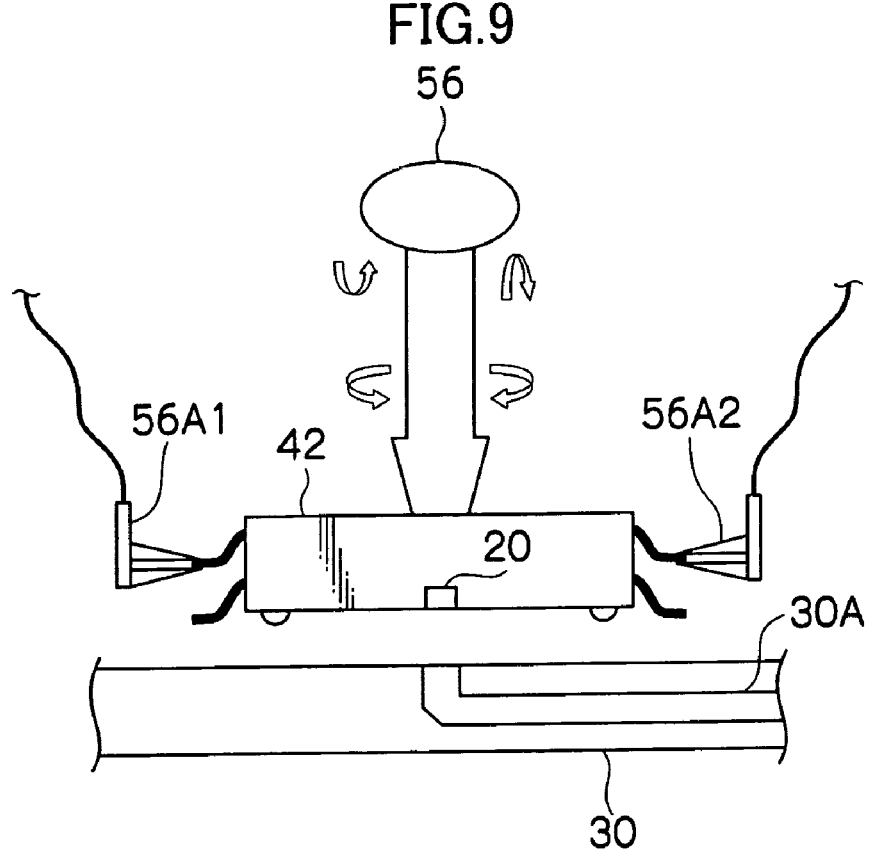
FIG. 9 is a view showing a state in which an IC chip is being moved to a scheduled position of arrangement.

On the other hand, if the first IC chip 42 has been judged satisfactory, in step 112, the first IC chip 42 is moved to a pre-specified scheduled position of arrangement. Specifically, the management device 64 stores information of scheduled positions of arrangement (x, y, z co-ordinate information) for arrangement of the respective IC chips and, on the basis of this information, moves the arm 50 to move the first IC chip 42 to the scheduled position of arrangement thereof. As shown in FIGS. 9 and 13A, a waveguide 30A is formed inside the printed circuit board 30. The scheduled position of arrangement is at a distal end position of the waveguide 30A. In the present step 112, the optical devices 20 of the IC chip 42 are arranged so as to be disposed at this scheduled position of arrangement (i.e., one end of the waveguide 30A).

In step 114, as shown in FIG. 13B, the light-detecting element 22 is disposed at a scheduled position of arrangement of the second IC chip, which will optically communicate with the first IC chip (an optical communication position, which is at the other end of the waveguide 30A).

Figure 10:
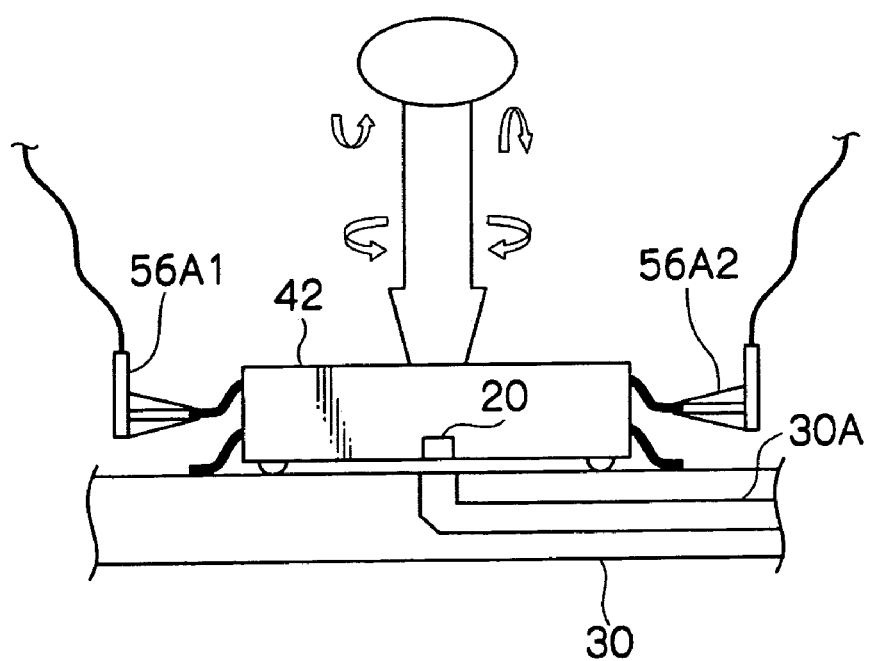
FIG. 10 is a view showing a state in which the IC chip is being finely adjusted for disposition at the scheduled position of arrangement.

In step 116, the first IC chip 42 is fixed at a position at which a signal from the light-detecting element 22 is maximized. That is, first, current is supplied to the optical devices 20 via the contact portions 56A1 and 56A2 and the contact test terminals 42B. Thus, the optical devices 20 are operated (caused to emit light). When the optical devices 20 emit light, light from the optical devices 20 passes through the waveguide 30A and reaches the light-detecting element 22 disposed at the optical communication position, as shown in FIG. 13B. Hence, a signal with a strength corresponding to an intensity of received light is inputted from the light-detecting element 22 to the controller 84. Hence in the present step 116, as shown in FIG. 10, the distal end portion 56 is finely adjusted in the X direction and the Y direction, and in inclination, and positions the IC chip 42 (i.e., the optical devices 20) at a position at which the strength of the signal from the light-detecting element 22 is maximized.

In the present step 116, current is supplied to the optical devices 20 through the contact portions 56A1 and 56A2 and the contact test terminals 42B. Note, however, that current could also be supplied through the printed circuit board power supply section 90, and through the lead wires 42A from the printed circuit board.

Figure 11:
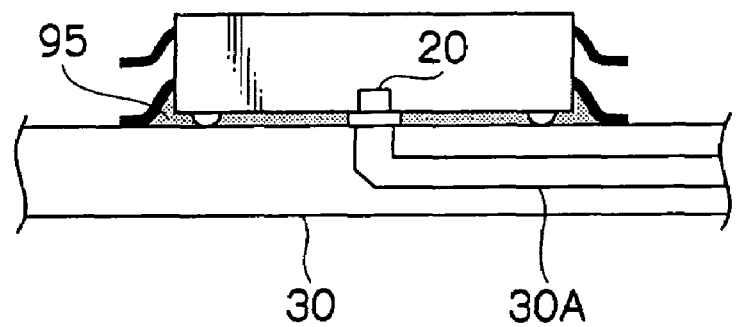
FIG. 11 is a view showing a state in which adhesive has been supplied to between the IC chip and a printed circuit board.

Then, in step 118, as shown in FIG. 11, adhesive 95 is supplied between the IC chip 42 and the printed circuit board 30 from an unillustrated adhesive supply apparatus. Hence, adhesiveness of the adhesive 95 is raised by irradiating the adhesive 95 with UV light, and the IC chip 42 is fixed to the printed circuit board 30. As known to those skilled in the art other methods of IC attachment may be used; i.e. Thermal Compression Bonding, Ultrasonic Bonding, Local Reflow, etc.

Figure 12:
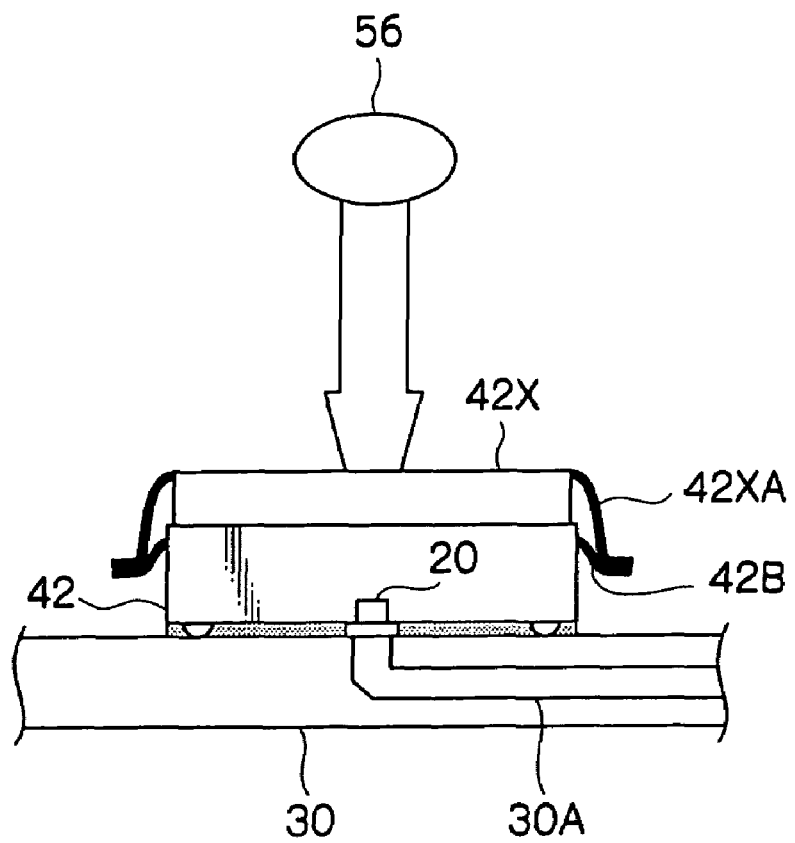
FIG. 12 is a view in which another IC chip is laminated onto the IC chip.

Thereafter, it is possible for another IC chip 42X to be stacked on the first IC chip 42, as is shown in FIG. 12. In such a case, lead wires 42XA of the other IC chip 42X connect with the contact test terminals 42B of the first IC chip 42.

Figure 8:
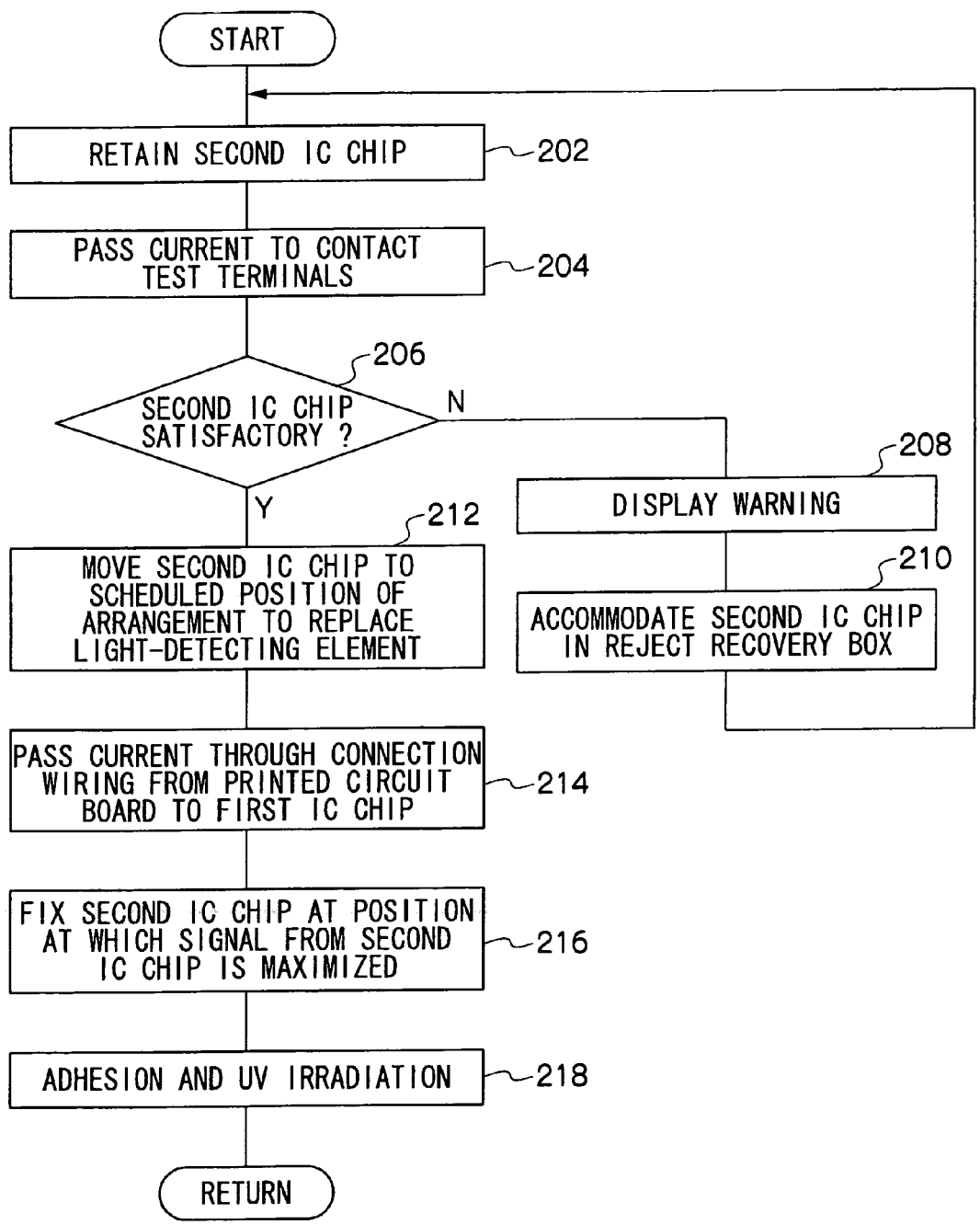
FIG. 8 is a flowchart showing a subroutine, of step 200 in FIG. 6, for arrangement processing of a second IC chip.

Next, arrangement processing of the second IC chip (step 200 in FIG. 6) will be described with reference to FIG. 8.

From step 202 to step 210, processing similar to steps 102 to 110 of the first IC chip arrangement processing described above is executed for the second IC chip.

In a subsequent step 212, as shown in FIG. 14A, a second IC chip 42Y is arranged by the arm 50 such that optical devices 20Y of the second IC chip 42Y are disposed at the above-mentioned optical communication position.

In step 214, current passes through the printed circuit board power supply section 90, and through the lead wires 42A from the printed circuit board, to the first IC chip 42.

As a result, as shown in FIG. 14A, the optical devices 20 of the first IC chip 42 emit light, and light from the optical devices 20 passes through the waveguide 30A to the optical devices 20Y of the second IC chip 42Y.

In step 216, in a similar manner to the above-described step 116, the second IC chip 42Y is fixed at a position at which a signal from the optical devices 20Y of the second IC chip 42Y is maximized.

In step 218, in a similar manner to the above-described step 118, adhesive is supplied between the second IC chip 42Y and the printed circuit board 30. Other methods of attachment, as known to those skilled in the art are also possible.

With the present embodiment as described above, before an IC chip is arranged at a printed circuit board, quality of the IC chip is judged, and unsatisfactory IC chips are recovered. Therefore, it is possible to prevent defective IC chips being arranged at the printed circuit board.

Furthermore, with the present embodiment, the mounted optical devices are not dedicated optical devices for positioning but are disposed at a scheduled position of arrangement. Therefore, optical devices that are to be positioned can be directly disposed at scheduled positions of arrangement, and positioning accuracy of IC chips can be improved.

In the embodiment described above, the arm 50 is singly provided, and the first IC chip and second IC chip are separately arranged at the printed circuit board. However, the present invention is not limited thus. As shown in FIG. 15, it is also possible to, for example, provide two arms, dispose both the first IC chip and the second IC chip at the scheduled positions of arrangement of the respective IC chips with the respective arms, adjust the positions of arrangement of the first IC chip and the second IC chip on the basis of optical communications between the first IC chip and the second IC chip, and then fix the IC chips.

In such a case, current may be supplied through the respective arms to the optical devices via the contact portions and contact test terminals, and current may also be supplied through a printed circuit board power supply section via the lead wires from the printed circuit board.

Figure 16:
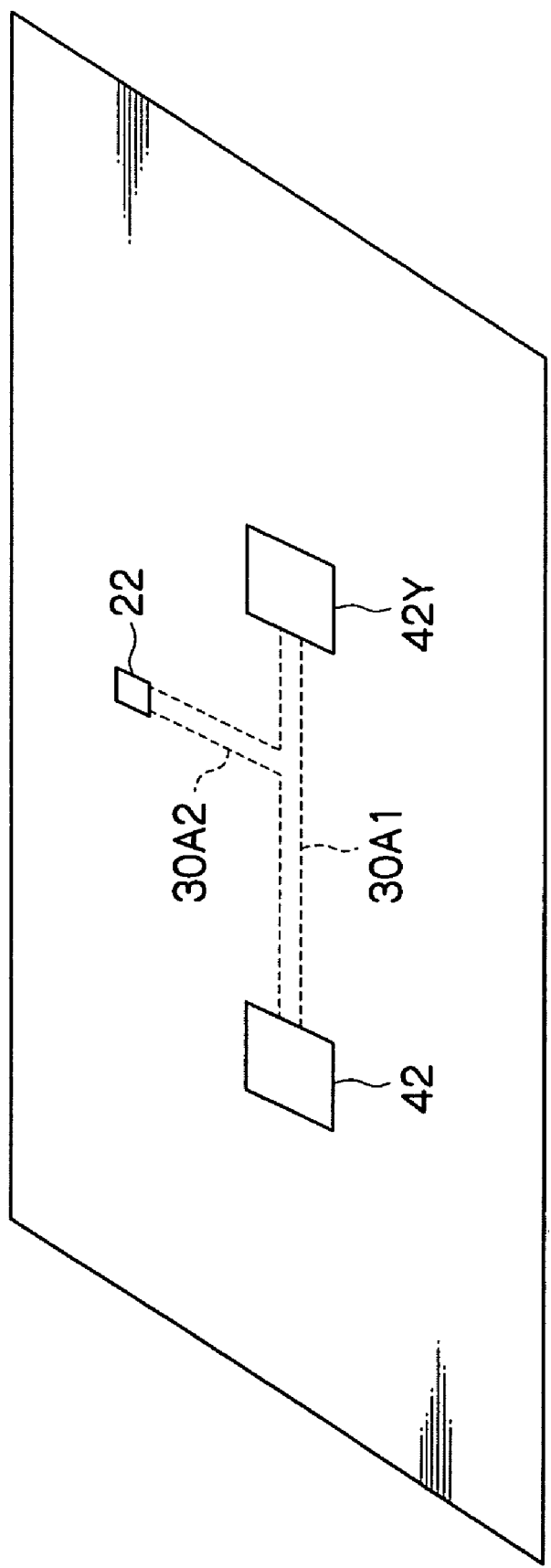
FIG. 16 is a view showing a waveguide of another variant example of the present embodiment.

Further, in the embodiment described above, as shown in FIGS. 13A and 13B, a single waveguide is formed in the printed circuit board to link the position of an optical device of the first IC chip 42 with the position of an optical device of the second IC chip 42Y. However, the present invention is not limited thus. As shown in FIG. 16, a waveguide 30A2 may be formed from a waveguide 30A1 which branches partway therealong. In other words, this waveguide is structured by the first waveguide 30A1, which links the position of the optical device of the first IC chip 42 with the position of the optical device of the second IC chip 42Y, and a second waveguide 30A2, which branches from the first waveguide 30A1 partway therealong. The light-detecting element 22 may be disposed at an exit aperture of the second waveguide 30A2.

Figure 17A:
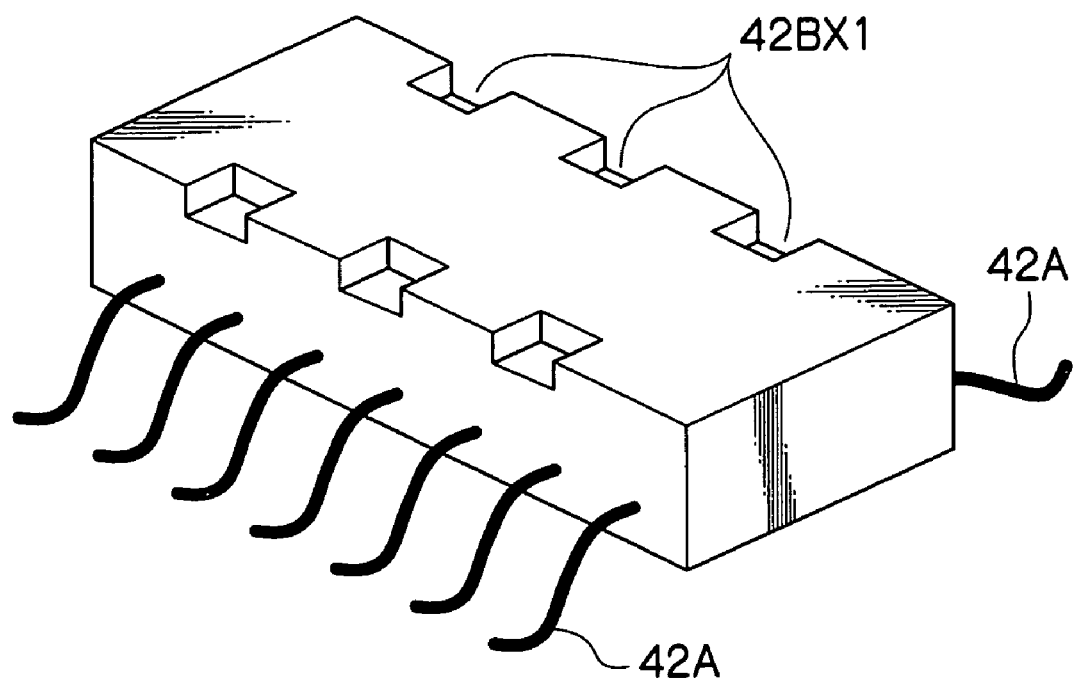
FIGS. 17A and 17B are views showing variant examples of the IC chip.
Figure 17B:
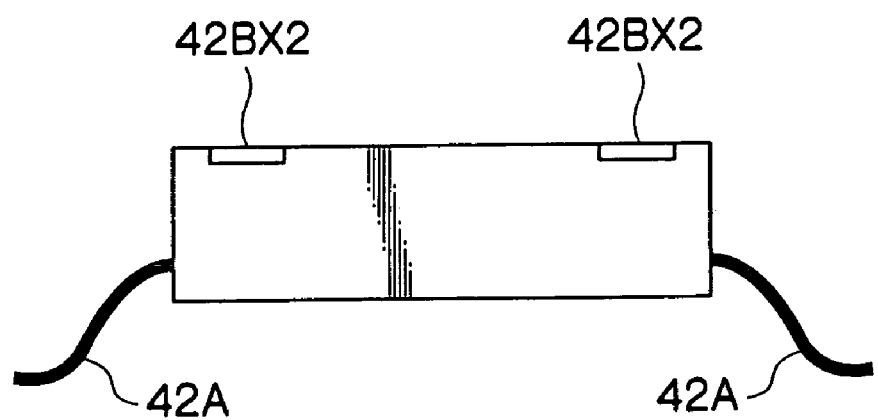

Further yet, although the contact test terminals are structured as connection wires, as shown in FIG. 2, the present invention is not limited thus. As shown in FIG. 17A, the contact test terminals may be structured as recess portions 42BX1 which are formed at an upper portion of the IC chip 42 and, as shown in FIG. 17B, the contact test terminals may be structured as surface terminals 42BX2 which are provided at a top face of the IC chip 42.

The embodiment described above has a structure in which the suction portion applies suction to the IC chip and the contact test terminals of the IC chip make contact with the contact portions at the distal end of the arm. However, the present invention is not limited thus. Structures are also possible in which the suction portion is omitted and the IC chip is retained by retention of the contact test terminals of the IC chip.

Further again, in the embodiment described above, the IC chip is provided separately with the lead wires and the contact test terminals. However, it is also possible to provide wires which feature the functions of both the lead wires and the contact test terminals.

Now, in a semiconductor integrated circuit of the present invention, a second electricity supply portion may be connected to be capable of operating the optical device by supplying current, and a first electricity supply portion may be structured to be connectable with a board at which the semiconductor integrated circuit is to be arranged.

Further, the second electricity supply portion may be structured to be connectable with another semiconductor integrated circuit.

The first electricity supply portion may be structured to be connectable with another semiconductor integrated circuit. When the second electricity supply portion is structured to be connectable with the other semiconductor integrated circuit as described above, the other semiconductor integrated circuit may be structured such that the first electricity supply portion is connectable with the other semiconductor integrated circuit. Further, the second electricity supply portion may be structured to be connectable with a first electricity supply portion of the other semiconductor integrated circuit.

Here, at the semiconductor integrated circuit arrangement device of the present invention, a retaining portion retains the semiconductor integrated circuit via the second electricity supply portions of the semiconductor integrated circuit. In this case, the second electricity supply portion of the semiconductor integrated circuit is connected to be capable of operating the optical device by supplying current.

A movement section moves the retaining portion. When the movement section moves the retaining portion thus, the semiconductor integrated circuit can be arranged at a predetermined position.

An operating portion operates the optical device by supplying current through the retaining portion and the second electricity supply portion. Here, the operating portion supplies current to the optical device via the retaining portion and the second electricity supply portion while the retaining portion is retaining the semiconductor integrated circuit. In such a case, the operating portion may supply current to the optical device before the movement section moves the retaining portion.

Further, a judgment section judges quality of the optical device on the basis of an operating state of the optical device caused by the operating portion. Because the semiconductor integrated circuit includes the optical device(s) and is structured so as to exhibit a predetermined function, quality of the optical device(s) corresponds to quality of the semiconductor circuit.

In this manner, the optical device is operated by the supply of current through the retaining portion and the second electricity supply portion, and whether the optical device is satisfactory or not is determined on the basis of the operating state of the optical device. Thus, it is possible to judge quality of the semiconductor circuit by a direct judgment of the quality of the optical device for performing the predetermined function.

If, as described earlier, the operating portion supplies current to the optical device and quality of the optical device is judged on the basis of the operating state of the optical device before the movement section moves the retaining portion, the quality of the semiconductor integrated circuit can be judged before the semiconductor integrated circuit is arranged at the predetermined position. As a result, it is possible to prevent a defective semiconductor integrated circuit from being arranged at the predetermined position.

The movement section disposes the semiconductor integrated circuit at the pre-specified scheduled position of arrangement and disposes a positioning optical device at an optical communication position, at which optical communication with the optical device of the semiconductor integrated circuit is possible, and the optical device is operated. In this state, the movement section positions the semiconductor integrated circuit on the basis of conditions of optical communication between the optical device and the positioning optical device. Consequently, it is possible to directly dispose the optical device that is to be positioned at the scheduled position of arrangement, and it is possible to improve accuracy of positioning of the semiconductor integrated circuit.

Incidentally, it is possible that the positioning optical device is structured by an individual optical element and that, after the movement section has positioned the semiconductor integrated circuit, the movement section moves another semiconductor integrated circuit such that an optical device of the other semiconductor integrated circuit is disposed at the optical communication position instead of the positioning optical device, and the movement section positions the other semiconductor integrated circuit on the basis of conditions of optical communication between the optical device(s) of the semiconductor integrated circuit and the optical device(s) of the other semiconductor integrated circuit.

In this case, the other semiconductor integrated circuit is positioned using the optical device thereof, which is for implementing a predetermined function at the other semiconductor integrated circuit. Thus, it is possible to directly dispose the optical device that is to be positioned at a scheduled position of arrangement, and it is possible to improve accuracy of positioning of the other semiconductor integrated circuit.

It is also possible for the positioning optical device to be the optical device of the other semiconductor integrated circuit, with the movement section positioning the semiconductor integrated circuit and the other semiconductor integrated circuit on the basis of conditions of optical communication between the optical device(s) of the semiconductor integrated circuit and the optical device(s) of the other semiconductor integrated circuit.

In this case too, because the semiconductor integrated circuits are positioned using the optical devices thereof, which are for implementing the predetermined functions, it is possible to directly dispose the optical devices that are to be positioned at the scheduled positions of arrangement, and it is possible to improve accuracy of positioning of the semiconductor integrated circuits.

Herein, at a semiconductor integrated circuit arrangement device of the present invention, it is possible that the positioning optical device is structured by an individual optical element and that, after the movement section has positioned the semiconductor integrated circuit, the movement section moves another semiconductor integrated circuit such that, instead of the positioning optical device, an optical device of the other semiconductor integrated circuit is disposed at the optical communication position to serve as a positioning optical device, and the movement section positions the other semiconductor integrated circuit on the basis of conditions of optical communication between the optical device(s) of the semiconductor integrated circuit and the optical device(s) of the other semiconductor integrated circuit.

Furthermore, it is possible for the positioning optical device to be the optical device of the other semiconductor integrated circuit, with the movement section positioning the semiconductor integrated circuit and the other semiconductor integrated circuit on the basis of conditions of optical communication between the optical device(s) of the semiconductor integrated circuit and the optical device(s) of the other semiconductor integrated circuit.

With these inventions too, it is possible to directly dispose optical devices that are to be positioned at scheduled positions of arrangement, and it is possible to improve accuracy of positioning of semiconductor integrated circuits.

Now, a semiconductor integrated circuit arrangement process relating to the present invention includes: in a state in which a semiconductor integrated circuit which includes an optical device for optical communication and is structured so as to exhibit a predetermined function is retained, a step of operating the optical device; a step of judging quality of the optical device on the basis of an operating state of the optical device; a step of disposing a positioning optical device at an optical communication position, at which optical communication with the optical device of the semiconductor integrated circuit is possible when the semiconductor integrated circuit is disposed at a pre-specified scheduled position of arrangement; and a step of moving the semiconductor integrated circuit, whose optical device has been judged to be satisfactory, to the scheduled position of arrangement and positioning the semiconductor integrated circuit on the basis of a condition of optical communication between the optical device and the positioning optical device.

That is, the optical device is operated in the state in which the semiconductor integrated circuit which includes the optical device for optical communication and is structured so as to exhibit the predetermined function is being retained.

Here, the semiconductor integrated circuit in this case may be one of the semiconductor integrated circuits described above, and may be the following semiconductor integrated circuit. Specifically, it may be a semiconductor integrated circuit which includes an optical device for optical communication and is structured so as to exhibit a predetermined function, which semiconductor integrated circuit includes an electricity supply portion connected to the optical device, this electricity supply portion being connected to be capable of operating the optical device by supplying current, and the semiconductor integrated circuit being capable of being retained by means of the electricity supply portion.

Further, with this invention, the semiconductor integrated circuit is retained and the optical device is operated, and quality of the optical device is judged on the basis of a state of operation.

Then, when the semiconductor integrated circuit is disposed at the pre-specified scheduled position of arrangement, the positioning optical device is disposed at the optical communication position, at which optical communication with the optical device of the semiconductor integrated circuit is possible. The semiconductor integrated circuit, whose optical device has been judged to be satisfactory, is moved to the scheduled position of arrangement, and the semiconductor integrated circuit is positioned on the basis of conditions of optical communication between the optical device and the positioning optical device.

Because only a semiconductor integrated circuit whose optical device has been determined to be satisfactory is moved to the scheduled position of arrangement, unsatisfactory products can be removed. Further, because the semiconductor integrated circuit is positioned on the basis of conditions of optical communication between the optical device and the positioning optical device, the semiconductor integrated circuit is positioned using the optical device thereof which is for performing the predetermined function. Therefore, it is possible to directly dispose the optical device that is to be positioned at the scheduled position of arrangement, and it is possible to improve accuracy of positioning of the semiconductor integrated circuit.

The present invention, as has been described above, has the effect of making it possible to prevent the arrangement of defective semiconductor integrated circuits at predetermined positions.

Moreover, the present invention has the effect of enabling direct positioning of optical devices that are to be positioned at scheduled positions of arrangement, and of enabling an improvement in positioning accuracy of semiconductor integrated circuits.

What is claimed is:

1. A semiconductor integrated chip having a top face and a bottom face, which includes an optical device disposed at the bottom face for optical communication and is structured so as to exhibit a predetermined function, the semiconductor integrated chip comprising:
   a first electricity supply portion including a plurality of lead wires, which are connected to the optical device and disposed near the bottom face at lower portions of two opposite side faces of the semiconductor integrated chip; and
   a second electricity supply portion including a plurality of contact test terminals, which are connected to the optical device and disposed near the top face at upper portions of the two opposite side faces of the semiconductor integrated chip,
   wherein the second electricity supply portion is connected to the optical device so as to enable operation of the optical device by supplying current.

2. The semiconductor integrated chip of claim 1, wherein the second electricity supply portion is structured to be connectable with another semiconductor integrated chip.

3. The semiconductor integrated chip of claim 1, wherein the first electricity supply portion is structured to be connectable with a board at which the semiconductor integrated chip is to be arranged.

4. The semiconductor integrated chip of claim 1, wherein the first electricity supply portion is structured to be connectable with another semiconductor integrated chip.

5. The semiconductor integrated chip of claim 2, wherein the second electricity supply portion is structured to be connectable with a first electricity supply portion of the other semiconductor integrated chip.

* * * * *